(12) United States Patent
Ishii

(10) Patent No.: US 9,084,210 B2
(45) Date of Patent: Jul. 14, 2015

(54) USER TERMINAL AND COMMUNICATION CONTROL METHOD

(75) Inventor: Hiroyuki Ishii, Kanagawa (JP)

(73) Assignee: NTT DOCOMO, INC., Tokyo (JP)

(*) Notice: Subject to any disclaimer, the term of this patent is extended or adjusted under 35 U.S.C. 154(b) by 173 days.

(21) Appl. No.: 13/058,371

(22) PCT Filed: Aug. 11, 2009

(86) PCT No.: PCT/JP2009/064161
§ 371 (c)(1),
(2), (4) Date: Apr. 19, 2011

(87) PCT Pub. No.: WO2010/018820
PCT Pub. Date: Feb. 18, 2010

(65) Prior Publication Data
US 2011/0188427 A1  Aug. 4, 2011

(30) Foreign Application Priority Data
Aug. 11, 2008 (JP) ................................. 2008-207518

(51) Int. Cl.
*H04W 52/02* (2009.01)
*H04W 52/36* (2009.01)
*H04W 52/50* (2009.01)

(52) U.S. Cl.
CPC ............ *H04W 52/367* (2013.01); *H04W 52/50* (2013.01)

(58) Field of Classification Search
CPC combination set(s) only.
See application file for complete search history.

(56) References Cited

U.S. PATENT DOCUMENTS

| 5,673,259 A | * | 9/1997 | Quick, Jr. ...................... 370/342 |
| 6,512,931 B1 | * | 1/2003 | Park et al. ..................... 455/522 |
| 7,986,959 B2 | * | 7/2011 | Malladi et al. ................ 455/522 |
| 8,000,294 B2 | * | 8/2011 | Uemura et al. ............... 370/329 |
| 2004/0147274 A1 | * | 7/2004 | Khawand et al. ............. 455/522 |
| 2006/0105797 A1 | * | 5/2006 | Marsan et al. ................ 455/522 |

(Continued)

FOREIGN PATENT DOCUMENTS

| GB | 2 445 336 A | 5/2007 |
| WO | 2007/052753 A1 | 5/2007 |

OTHER PUBLICATIONS

3GPP TS 36.213, May 2008. "Technical Specification Group Radio Access Network: Evolved Universal Terrestrial Radio Acess (E-UTRA); Physical Layer Procedures". Retrieved on Jul. 19, 2013 from <www.3gpp.org/ftp/Specs/archive/36_series/36.213/36213-830>.*

(Continued)

*Primary Examiner* — Brian J Gillis
*Assistant Examiner* — Juan C Turriate Gastulo
(74) *Attorney, Agent, or Firm* — Osha Liang LLP

(57) ABSTRACT

To set the maximum transmission power of a random access preamble suitably based on both of complexity of the mobile terminal and transmission characteristics (distance of the cell radius), the mobile terminal sets the maximum transmission power of the random access preamble at a value lower than the rated power of the mobile terminal based on the system bandwidth, a transmission frequency band of the random access preamble, and identification information of the root sequence of the random access preamble. In this case, it is possible to provide a user terminal and communication control method in a mobile communication system for enabling reductions in the uplink cell radius to be avoided, while reducing complexity of a power amplifier in the mobile terminal.

3 Claims, 6 Drawing Sheets

(56) References Cited

U.S. PATENT DOCUMENTS

| | | | | |
|---|---|---|---|---|
| 2007/0253473 | A1* | 11/2007 | Ishii et al. | 375/224 |
| 2008/0144541 | A1* | 6/2008 | Somasundaram et al. | 370/278 |
| 2008/0200178 | A1* | 8/2008 | Hamabe | 455/452.1 |
| 2008/0259861 | A1* | 10/2008 | Kang et al. | 370/329 |
| 2010/0029289 | A1* | 2/2010 | Love et al. | 455/450 |
| 2010/0103906 | A1* | 4/2010 | Montojo et al. | 370/335 |
| 2010/0172299 | A1* | 7/2010 | Fischer et al. | 370/328 |
| 2010/0290363 | A1* | 11/2010 | Johansson et al. | 370/252 |
| 2011/0158104 | A1* | 6/2011 | Frenger et al. | 370/241 |

OTHER PUBLICATIONS

3GPP TS 36.213 V8.0.0, Sep. 2007. "3rd Generation Partnership Project;Technical Specification Group Radio Access Network;Evolved Universal Terrestrial Radio Access (E-UTRA); Physical layer procedures (Release 8)" Retrieved on Oct. 8, 2014 from <http://www.qtc.jp/3GPP/Specs/36213-800.pdf>.*

3GPP TSG-RAN WG4 (Radio) Meeting #48 (R4-081825), Jun. 18-22, 2008. "Maximum Power Reduction of RACH Preamble." Retrieved on Oct. 9, 2014 from <http://isearch.3gpp.org/isysquery/666135f9-9e77-4fd3-b30b-0715f93a5258/5/doc/>.*

Nokia Corporation, et al., "Limiting power ramp-up of RACH preambles," 3GPP TSG-RAN WG2 Meeting #62bis, R2-083241, Jun. 30-Jul. 4, 2008, 4 pages.

3GPP TS 36.101 V8.2.0, "Evolved Universal Terrestrial Radio Access (E-UTRA); User Equipment (UE) radio transmission and reception," May 2008, 66 pages.

3GPP TS 36.211 V8.3.0 "Evolved Universal Terrestrial Radio Access (E-UTRA); Physical Channels and Modulation," May 2008, 77 pages.

3GPP TS 36.321 V8.2.0, "Evolved Universal Terrestrial Radio Access (E-UTRA) Medium Access Control (MAC) protocol specification," May 2008, 33 pages.

Texas Instruments, et al., "PRACH High-Speed Ncs Values," 3GPP TSG RAN WG1 #51, R1-075058, Nov. 5-9, 2007, 6 pages.

International Search Report issued in PCT/JP2009/064161, mailed on Nov. 17, 2009, with translation, 3 pages.

Decision to Grant a Patent issued in Japanese Patent Application No. 2010-524729, issued Sep. 17, 2013, with English translation thereof (4 pages).

* cited by examiner

USER TERMINAL AND COMMUNICATION CONTROL METHOD

TECHNICAL FIELD

The present invention relates to the technical field of mobile communications, and more particularly, to a user terminal and communication control method in mobile communication systems using the next-generation mobile communication technique.

BACKGROUND ART

The communication system that is a successor to the Wideband Code Division Multiple Access (WCDMA) system and High Speed Uplink Packet Access (HSUPA) system i.e. the Long Term Evolution (LTE) system has been studied by 3GPP that is the standardization group of WCDMA, and the specification development work has proceeded. As a radio access scheme in LTE, Orthogonal Frequency Division Multiplexing Access (OFDMA) is defined in downlink, while Single-Carrier Frequency Division Multiple Access (SC-FDMA) is defined in uplink (for example, see Non-patent literature 1 for the details).

The OFDMA system is a multicarrier transmission system for dividing a frequency band into a plurality of narrow frequency bands (subcarriers), and assigning data to each frequency band to perform transmission. High-speed transmission is actualized by densely arranging subcarriers in the frequency domain to be orthogonal to one another, and it is expected to enhance spectral efficiency.

The SC-FDMA system is a single-carrier transmission system for dividing the frequency band for each terminal, and performing transmission using different frequency bands among a plurality of terminal. The system is capable of reducing interference among the terminals with ease and efficiency, and further decreasing variations in the transmission power, and therefore, is preferable from the viewpoints of power consumption in the terminal, increases in coverage and the like.

In LTE, in both of downlink and uplink, one or more resource blocks are assigned to a mobile terminal to perform communications. A base station apparatus determines a mobile terminal, to which it assigns resource blocks, from among a plurality of mobile terminals for each sub-frame (1 ms in LTE) (this process is called scheduling.) In downlink, the base station apparatus transmits a shared channel to the mobile terminal selected in scheduling in one or more resource blocks. In uplink, the selected mobile terminal transmits a shared channel to the base station apparatus in one or more resource block. In addition, the shared channel is the PUSCH in uplink, while being the PDSCH in downlink.

Meanwhile, in LTE, random access is used for initial connection, etc. The channel for random access is referred to as the Physical Random Access channel (PRACH). Further, the mobile terminal transmits a random access preamble on the Physical Random Access Channel. The details of the Physical Random Access Channel and the random access preamble are defined, for example, in Non-patent literature 1.

In addition, in cellular telephones, radio astronomy, satellite communications, aeronautical/marine radar, earth resources satellite and wireless LAN, used frequency bands are divided to prevent mutual interference. Further, for example, a plurality of systems exits in the frequency band assigned to the system of cellular telephone, and the frequency band of each system is divided.

In other words, in the systems using radio signals, interference among the systems is prevented by dividing the used frequency bands. However, since a transmitter that radiates radio signals radiates unwanted emissions (hereinafter, referred to as adjacent channel interference) in bands outside the frequency band of the system, even when the frequency bands are divided, a plurality of adjacent systems mutually imposes interference. Accordingly, when the power level of the unwanted emissions is high, the serious adverse effect is given to the adjacent system.

To prevent the adverse effect on the adjacent system by such adjacent channel interference, performance concerning the adjacent channel interference and characteristics on spurious emission is specified in each system. For example, in the LTE system, as the specification on adjacent channel interference, spurious emission and the like in a mobile terminal, 6.6 Output RF spectrum emissions in TS36.101 exists (Non-patent literature 2).

In addition, to suppress the above-mentioned unwanted emissions to outside the system band, the mobile terminal needs to be equipped with a power amplifier with high linearity. Accordingly, in the case of considering the cost and size of the mobile terminal, there are cases that it is difficult to reduce the above-mentioned unwanted emissions, or meet the specification of adjacent channel interference and the specification of spurious emission as described above. In this case, for example, in Non-patent literature 2 as described above, to suppress the cost and size of the mobile terminal, it is specified to reduce the maximum transmission power on some condition. The reduction in the maximum transmission power is referred to as Maximum power reduction (MPR). For example, in LTE, the MPR is defined based on the modulation scheme, system bandwidth and the number of resource blocks (Non-patent literature 2, Table 6.2.3-1). By reducing the maximum transmission power, it is possible to control the cost and size of the mobile terminal to within small values.

CITATION LIST

Non-Patent Literature

[NON-PATENT Literature 1] 3GPP TS 36.211 (V8.3.0), "Physical Channels and Modulation," May 2008
[NON-PATENT Literature 2] 3GPP TS 36.101 (V8.2.0), "E-UTRA UE radio transmission and repetition"
[NON-PATENT Literature 3] 3GPP TS 36.321 (V8.2.0), "E-UTRA MAC protocol specification"
[NON-PATENT Literature 4] R1-075058, PRACH High-Speed Ncs Values, 2007-11

SUMMARY OF THE INVENTION

Technical Problem

However, the following problems exist in the above-mentioned background technique.

The above-mentioned MPR is applied to the physical uplink shared channel PUSCH, but is not applied to the uplink random access channel PRACH or the random access preamble transmitted on the PRACH. Also in the random access preamble on the PRACH, the above-mentioned problem associated with the unwanted emissions to outside the system band exists, and it is necessary to apply the above-mentioned MPR.

However, in the case of applying the MPR, the maximum transmission power is decreased in uplink, and as a result, the problem arises that the cell radius is decreased in uplink. In other words, from the viewpoint of the uplink cell radius, it is desirable that the MPR is applied as few as possible.

In view of the above-mentioned problems, it is an object of the invention to provide a user terminal and communication control method in a mobile communication system for enabling reductions in the uplink cell radius to be avoided, while reducing complexity of a power amplifier in the mobile terminal, by applying the MPR to the random access preamble while reducing the MPR range to as small as possible.

Solution to Problem

In the invention, used is a user terminal that performs radio communications with a base station apparatus in a mobile communication system. The user terminal is provided with a parameter acquiring section configured to acquire a parameter from the base station apparatus, and a preamble transmitting section configured to transmit a random access preamble to the base station apparatus. The preamble transmitting section reduces the maximum value of transmission power of the random access preamble to be lower than rated power defined in the mobile communication system based on the parameter.

Technical Advantage of the Invention

According to the invention, it is possible to provide a user terminal and communication control method in a mobile communication system for enabling reductions in the uplink cell radius to be avoided, while reducing complexity of a power amplifier in the mobile terminal, by applying the MPR to the random access preamble while reducing the MPR range to as small as possible.

DESCRIPTION OF EMBODIMENTS

Figure 1:
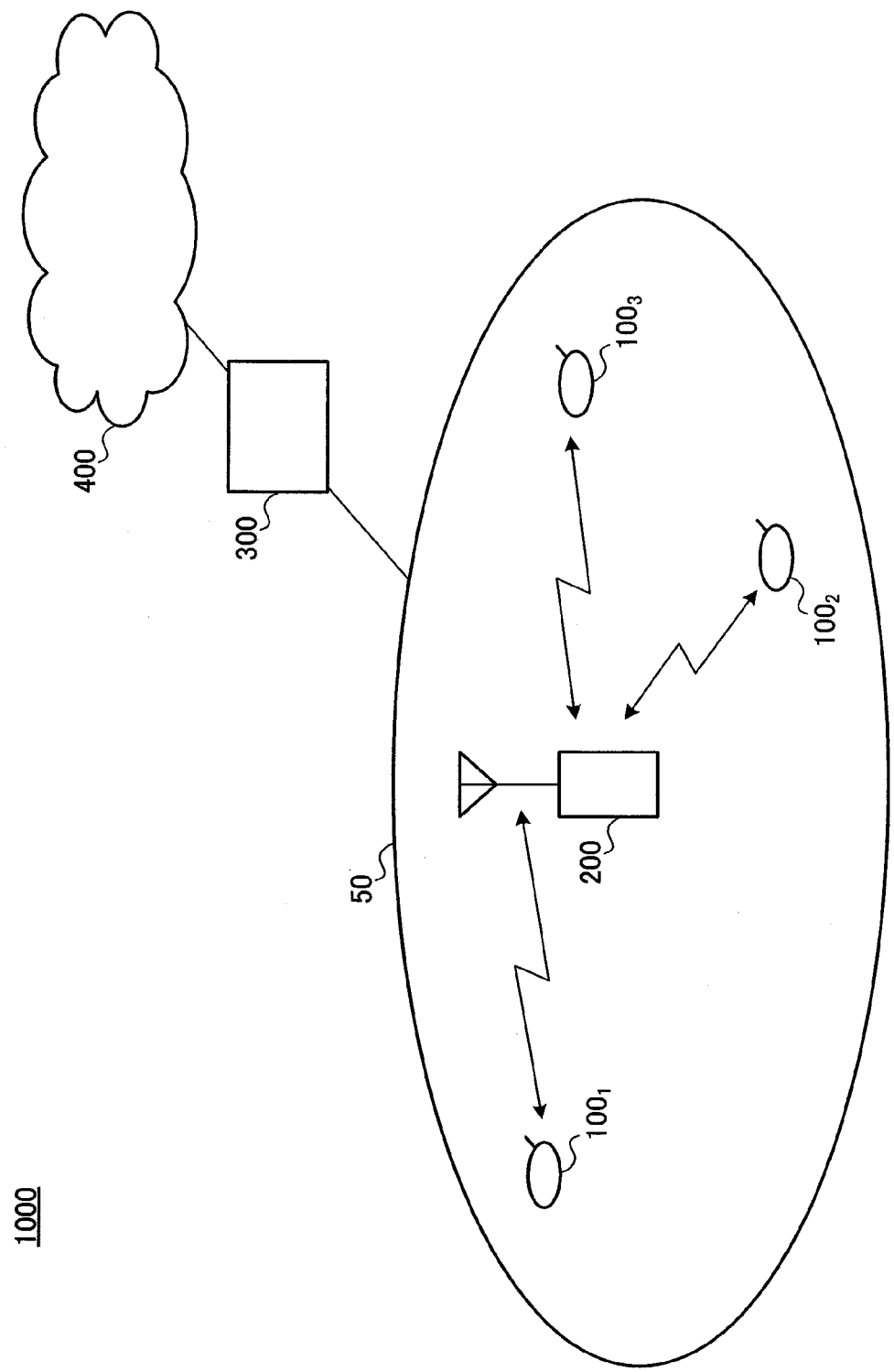
FIG. 1 is a block diagram illustrating a configuration of a mobile communication system according to an Embodiment of the invention.

The Embodiment of the invention will be described below with reference to drawings. In all the diagrams to explain the Embodiment, components having the same functions are assigned the same reference numerals to omit redundant descriptions. A mobile communication system having a mobile terminal and base station apparatus according to the Embodiment of invention will be described with reference to FIG. 1.

A mobile communication system 1000 is a system to which Evolved UTRA and UTRAN (alias: Long Term Evolution, or Super 3G) is applied, for example, and is provided with a base station apparatus (eNB: e Node B) 200 and a plurality of mobile terminal 100 ($100_1$, $100_2$, $100_3$, ..., $100_n$, n is an integer where n>0) that communicates with the base station apparatus 200. The base station apparatus 200 is connected to an upper node, for example, access gateway apparatus 300, and the access gateway apparatus 300 is connected to a core network 400. The mobile terminal 100n communicates with the base station apparatus 200 in a cell 50 by Evolved UTRA and UTRAN. In addition, the access gateway 300 may be also referred to as MME/SGW (Mobility Management Entity/ Serving Gateway).

Each mobile terminal ($100_1$, $100_2$, $100_3$, ..., $100_n$) has the same configuration, function and state, and is described as the mobile terminal 100n below unless otherwise specified. For convenience in description, the mobile terminal performs radio communications with the base station apparatus, and more generally, may be user equipment (UE) including a mobile terminal and a fixed terminal.

In the mobile communication system 1000, as a radio access scheme, OFDMA (Orthogonal Frequency Division Multiplexing Access) is applied in downlink, while SC-FDMA (Single-Carrier Frequency Division Multiple Access) is applied in uplink. As described above, OFDMA is a multicarrier transmission system for dividing a frequency band into a plurality of narrow frequency bands (subcarriers), and mapping data to each frequency band to perform transmission. SC-FDMA is a single-carrier transmission system for dividing the frequency band for each terminal so that a plurality of terminals uses different frequency bands to perform transmission, and thereby enabling interference among the terminals to be reduced.

Described herein are communication channels in Evolved UTRA and UTRAN.

In downlink, used are the Physical Downlink Shared Channel (PDSCH) shared among the mobile terminal 100n, and the Physical Downlink Control Channel (Downlink L1/L2 control channel). User data i.e. normal data signals are transmitted on the Physical Downlink Shared Channel. Further, on the Physical Downlink Control Channel, notified are the ID of a user that performs communications using the Physical Downlink Shared Channel and information of transport format of the user data i.e. Downlink Scheduling Information, and the ID of a user that performs communications using the Physical Uplink Shared Channel and information of transport format of the user data i.e. Uplink Scheduling Grant, etc.

Further, in downlink, broadcast channels are transmitted such as the Physical-Broadcast Channel (P-BCH), Dynamic Broadcast Channel (D-BDH) and so on. The information transmitted on the P-BCH is Master Information Block (MIB), and the information transmitted on the D-BCH is System Information Block (SIB). The D-BCH is mapped to the PDSCH, and transmitted from the base station apparatus 200 to the mobile terminal 100n.

In uplink, used are the Physical Uplink Shared Channel (PUSCH) shared among the mobile terminal 100, and the Physical Uplink Control Channel (PUCCH) that is the control channel in uplink. User data i.e. normal data signals are transmitted on the Physical Uplink Shared Channel. Further, the acknowledgement information for the downlink shared channel, downlink radio quality information (CQI: Channel Quality Indicator), etc. is transmitted on the Physical Uplink Control Channel.

In addition, in uplink, the Physical Random Access Channel (PRACH) is defined for initial connection and the like. The mobile terminal 100 transmits a random access preamble on the PRACH.

Figure 2:
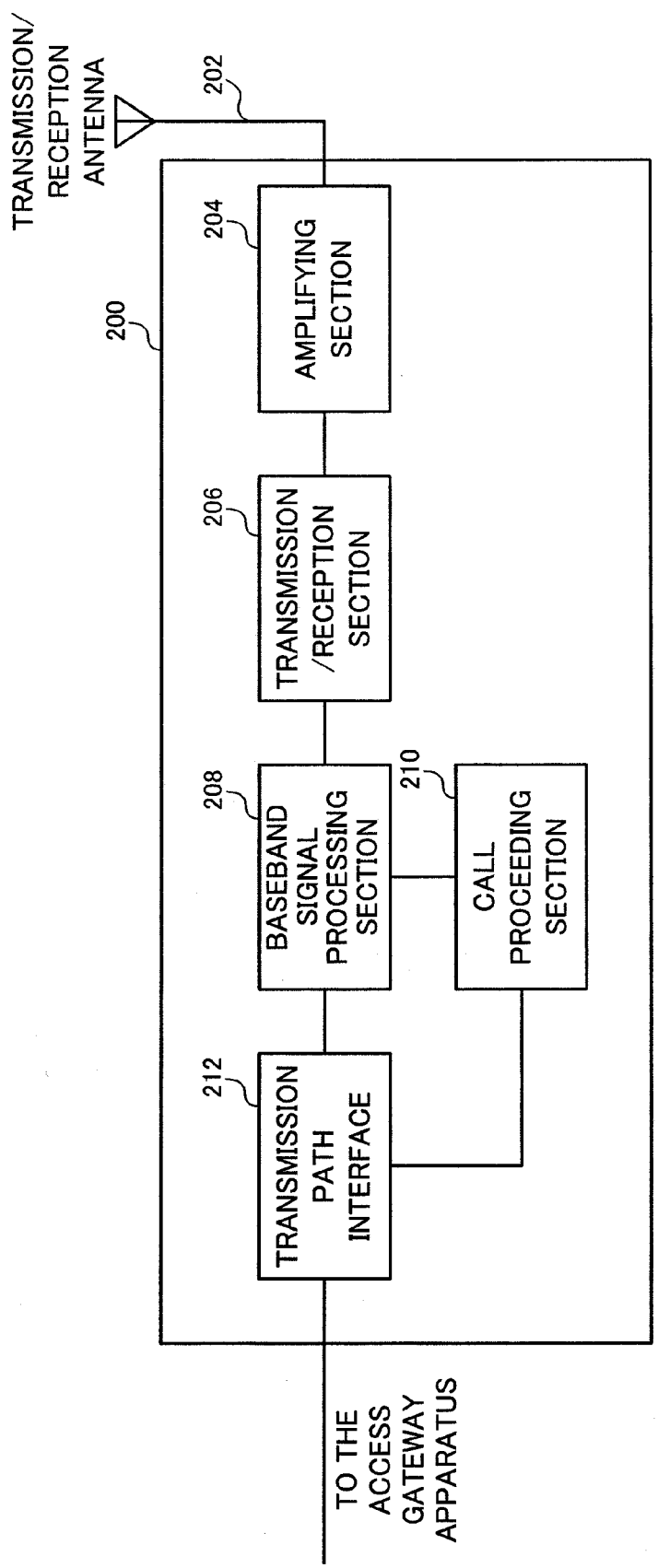
FIG. 2 is a partial block diagram illustrating a base station apparatus in the mobile communication system according to an Embodiment of the invention.

The base station apparatus 200 according to the Embodiment of the invention will be described with reference to FIG. 2. The base station apparatus 200 according to this Embodiment is provided with a transmission/reception antenna 202, amplifying section 204, transmission/reception section 206, baseband signal processing section 208, call proceeding section 210 and transmission path interface 212.

The user data transmitted from the base station apparatus 200 to the mobile terminal 100 in downlink is input to the baseband signal processing section 208 via the transmission path interface 212 from an upper node for the base station apparatus 200, for example, access gateway apparatus 300.

The baseband signal processing section 208 performs PDCP layer processing, segmentation and concatenation of user data, RLC (Radio Link Control) layer transmission processing such as transmission processing of RLC retransmission control, MAC (Medium Access Control) retransmission control e.g. transmission processing of HARQ (Hybrid Automatic Repeat request), scheduling, transmission format selection, channel coding, and Inverse Fast Fourier Transform (IFFT) processing on the data to transfer to the transmission/reception section 206. Further, the signal of the Physical Downlink Control Channel that is the downlink control channel undergoes the transmission processing such as channel coding and Inverse Fast Fourier Transform, and transferred to the transmission/reception section 206.

Further, the baseband signal processing section 208 notifies the mobile terminal 100 of the control information for communications in the cell on the above-mentioned broadcast channel. For example, the control information for communications in the cell includes the system bandwidth in uplink or downlink, the number of resource blocks (the number of RBs) of the PUCCH, identification information of the root sequence (Root Sequence Index) to generate a random access preamble signal on the PRACH, etc. In other words, the base station apparatus 200 notifies the mobile terminal 100 of the system bandwidth in uplink or downlink, the number of resource blocks (the number of RBs) of the PUCCH, identification information of the root sequence (Root Sequence Index) to generate a random access preamble signal on the PRACH, etc. as part of the broadcast information. In addition, the number of resource blocks (the number of RBs) of the PUCCH may be also referred to as a PUCCH resource size. Further, the base station apparatus 200 may notify the mobile terminal 200 of the information indicative of a position of the PRACH in the frequency domain i.e. position of resource blocks for the PRACH as part of the broadcast information. The information indicative of a position of resource blocks for the PRACH may be also referred to as Prach Freq Offset or Prach Frequency Offset. For example, when the value of Prach Frequency Offset is "4", since the number of resource blocks for the PRACH is "6", it is possible to identify resource blocks of resource block numbers 4 to 9 as the resource blocks for the PRACH.

The transmission/reception section 206 performs frequency conversion processing for converting the baseband signal output from the baseband signal processing section 208 into a radio frequency signal, and then, the radio frequency signal is amplified by the amplifying section 204, and is transmitted from the transmission/reception antenna 202.

Meanwhile, with respect to the data transmitted from the mobile terminal 100 to the base station apparatus 200 in uplink, a radio frequency signal received in the transmission/reception antenna 202 is amplified in the amplifying section 204, undergoes frequency conversion in the transmission/reception section 206, thereby is converted into a baseband signal, and is input to the baseband signal processing section 208.

The baseband signal processing section 208 performs FFT processing, IDFT processing, error correction decoding, reception processing of MAC retransmission processing, and reception processing of RLC layer and PDCP layer on the user data included in the input baseband signal, and the signal is transferred to the access gateway apparatus 300 via the transmission path interface 212.

Further, in uplink, a random access preamble transmitted from the mobile terminal 100 is received, and then, undergoes the processing of random access procedures specified in Non-patent literature 3.

The call proceeding section 210 performs call proceeding such as setting and release of communication channels, status management of the base station apparatus 200 and management of radio resources.

The mobile terminal 100 according to the Embodiment of the invention will be described with reference to FIG. 3.

Figure 3:
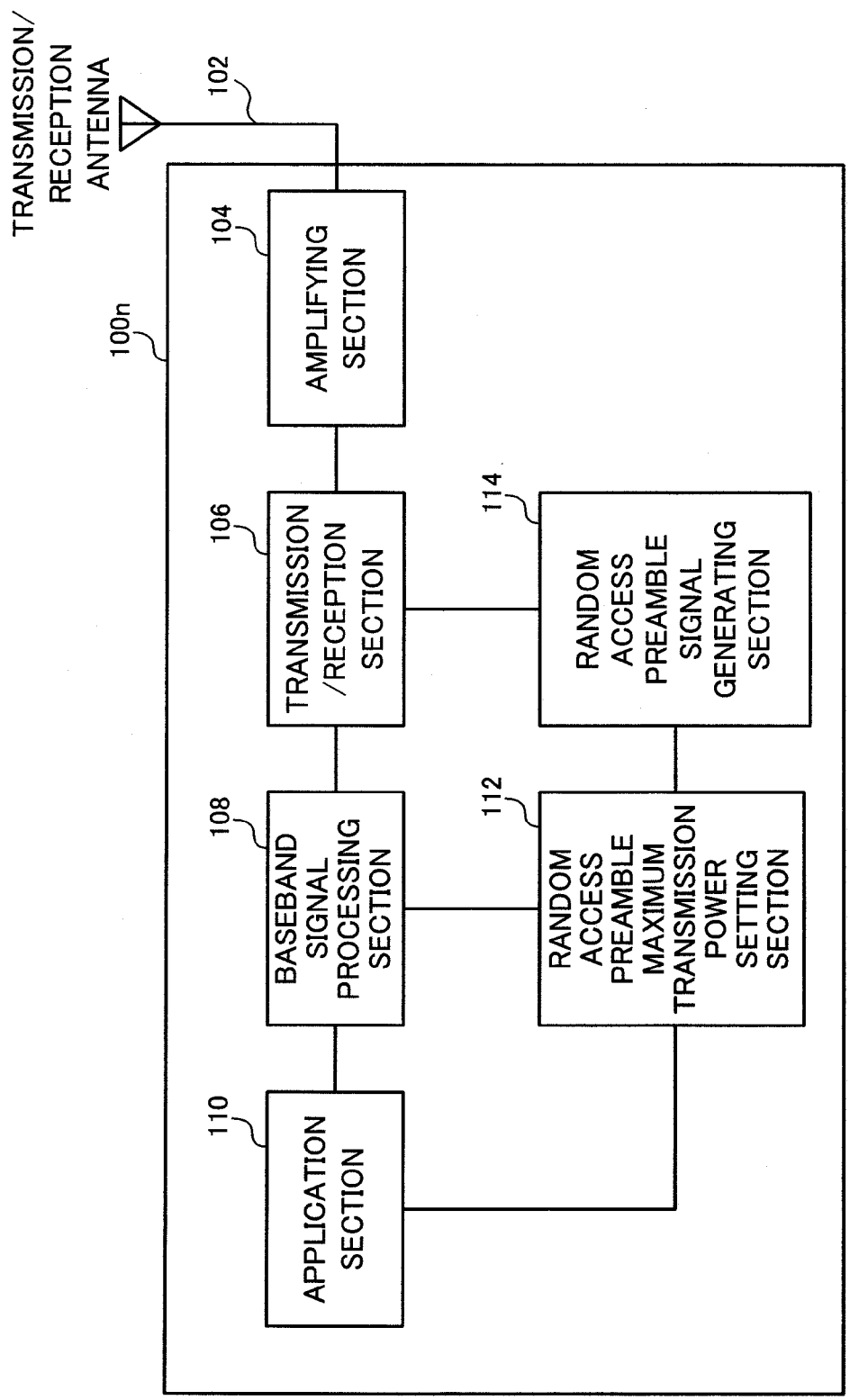
FIG. 3 is a partial block diagram illustrating a mobile terminal in the mobile communication system according to an Embodiment of the invention.

In FIG. 3, the mobile terminal 100 is provided with a transmission/reception antenna 102, amplifying section 104, transmission/reception section 106, baseband signal processing section 108, application section 110, random access preamble maximum transmission power setting section 112, and random access preamble signal generating section 114.

With respect to downlink data, the amplifying section 104 amplifies a radio frequency signal received in the transmission/reception antenna 102, the transmission/reception section 106 converts the radio frequency signal into a baseband signal. The baseband signal processing section 108 performs reception processing such as FFT processing, error correction decoding and retransmission control on the baseband signal. Among the above-mentioned downlink data, the downlink user data is transferred to the application section 110. The application section 110 performs the processing of predetermined layer higher than the physical layer and MAC layer. Further, among the above-mentioned uplink data, the broadcast information is also transferred to the application section 110.

As described previously, the broadcast information includes the system bandwidth in uplink or downlink, the number of resource blocks (the number of RBs) of the PUCCH, identification information of the root sequence (Root Sequence Index) to generate a random access preamble signal on the PRACH, information indicative of a position of resource blocks for the PRACH, etc. The application section 110 notifies the random access preamble maximum transmission power setting section 112 of the system bandwidth in uplink or downlink, the number of resource blocks (the number of RBs) of the PUCCH, identification information of the root sequence (Root Sequence Index) to generate a random access preamble signal on the PRACH, information indicative of a position of resource blocks for the PRACH, etc. included in the broadcast information.

Meanwhile, the uplink user data is input from the application section 110 to the baseband signal processing section 108. The baseband signal processing section 108 performs the transmission processing of Hybrid Automatic Repeat reQuest (H-ARQ (Hybrid ARQ)), channel coding, DFT processing, IFFT processing and the like on the user data to transfer to the transmission/reception section 106. The transmission/reception section 106 performs frequency conversion processing for converting the baseband signal, which is output from the baseband signal processing section 108, into a radio frequency signal, and then, the radio frequency signal is amplified by the amplifying section 104, and is transmitted from the transmission/reception antenna 102.

The random access preamble maximum transmission power setting section 112 receives, from the application section 110, the system bandwidth in uplink or downlink, the number of resource blocks (the number of RBs) of the PUCCH, identification information of the root sequence (Root Sequence Index) to generate a random access preamble signal on the PRACH, information indicative of a position of resource blocks for the PRACH, etc. included in the broadcast information.

Then, the random access preamble maximum transmission power setting section 112 is configured to determine the maximum transmission power of a random access preamble based on the system bandwidth in uplink or downlink, the number of resource blocks (the number of RBs) of the PUCCH, identification information of the root sequence (Root Sequence Index) to generate a random access preamble signal on the PRACH, information indicative of a position of resource blocks for the PRACH, etc. In addition, the maximum power of a random access preamble may be expressed as the maximum transmission power of the PRACH.

The method of determining the maximum transmission power of a random access preamble will specifically be described below. For example, based on the identification information of the root sequence to generate a random access preamble signal on the PRACH, the system bandwidth, and a first reference table to determine the maximum transmission power of a random access preamble as shown in Table 1, the random access preamble maximum transmission power setting section 112 may determine the MPR for the random access preamble, and by the MPR for the random access preamble, determine the maximum transmission power of the random access preamble. In addition, the maximum transmission power of a random access preamble is determined as described below:

(Maximum transmission power of a random access preamble)=rated power of the mobile terminal 100−MPR In addition, for example, the rated power of the mobile terminal 100 may be UE Maximum Output power (=23 dBm) as described in Table 6.2.2-1 in Non-patent literature 2.

TABLE 1

| | System Bandwidth | | | | | |
|---|---|---|---|---|---|---|
| | 1.4 MHz | 3 MHz | 5 MHz | 10 MHz | 15 MHz | 20 MHz |
| (1) The case of identification information of the root sequence ranging from 0 to 455 | | | | | | |
| MPR (dB) | 0 dB | 0 dB | 0 dB | 0 dB | 0 dB | 0 dB |
| (2) The case of identification information of the root sequence ranging from 456 to 837 | | | | | | |
| MPR (dB) | 2 dB | 2 dB | 1 dB | 0 dB | 0 dB | 0 dB |

More specifically, in the case that the identification information of the root sequence to generate a random access preamble signal on the PRACH is "10" (the case included in the range of 0 to 455), the maximum transmission power of a random access preamble may be determined, based on the reference table (1) of Table 1, assuming that MPR=0 dB in any values of the system bandwidth.

Alternately, in the case that the identification information of the root sequence to generate a random access preamble signal on the PRACH is "467" (the case included in the range of 456 to 837) and that the system bandwidth is 5 MHz, the maximum transmission power of a random access preamble may be determined, assuming that MPR=1 dB, based on the reference table (2) of Table 1 and the system bandwidth=5 MHz.

In addition, the details of the method of generating a random access preamble signal on the PRACH are described in 5.7.2 in Non-patent literature 1. Further, the definition of the identification information of the root sequence to generate a random access preamble signal on the PRACH is described in Table 5.7.2-4 in 5.7.2 in Non-patent literature 1.

Figure 4:
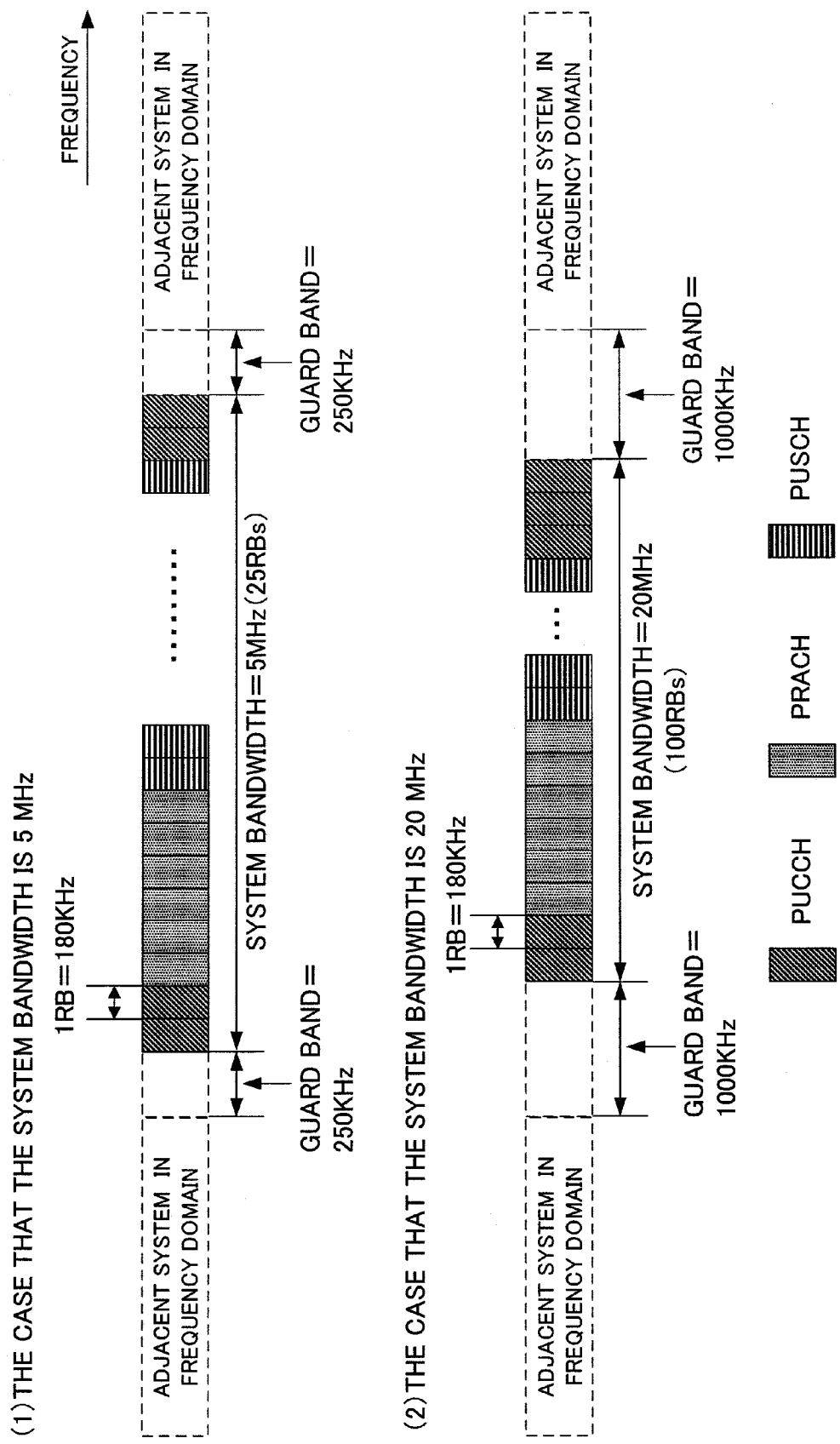
FIG. 4 is a diagram illustrating an effect by a method of determining maximum transmission power of a random access preamble according to the invention.

Referring to FIG. 4, described below is the effect of determining the maximum transmission power of a random access preamble based on the identification information of the root sequence to generate a random access preamble signal on the PRACH and based on the system bandwidth.

FIG. 4 shows the position relationship on the frequency domain between the transmission frequency band of the PRACH and the adjacent system, the system bandwidth is 5 MHz or 20 MHz. When the system bandwidth is 5 MHz, as shown in FIG. 4, the guard band having 250 KHz is defined. Meanwhile, when the system bandwidth is 20 MHz, as shown in FIG. 4, the guard band having 1000 KHz is defined. In other words, this means that the frequency interval between the transmission frequency band of the PRACH and the adjacent system in frequency domain when the system bandwidth is 5 MHz is smaller than the frequency interval between the transmission frequency band of the PRACH and the adjacent system in frequency domain when the system bandwidth is 20 MHz. The power level of unwanted emissions to outside the system band is decreased, as increases the frequency distance length between the frequency band of the PRACH and the system affected by the unwanted emissions i.e. the frequency interval between the transmission band of a transmission signal and the frequency band of the system affected by the unwanted emissions. Therefore, when the system bandwidth is 5 MHz, larger MPR is defined to decrease the power level of unwanted emissions to outside the system band, and it is thereby possible to reduce the effect by the unwanted emissions. Meanwhile, when the system bandwidth is 20 MHz, since the frequency distance length is large, the power level of unwanted emissions to outside the system band is low, and it is thereby possible not to apply the MPR or to decrease the value of MPR. As a result, it is possible to increase the maximum transmission power, and avoid reductions in the cell radius in uplink.

The identification information of the root sequence to generate a random access preamble signal on the PRACH is defined based on Cubic Metric as described in Non-patent literature 4. Herein, the Cubic Metric is one of indexes indicative of the power level of unwanted emissions to outside the system band as described above. In other words, when the Cubic Metric is high, the power level of unwanted emissions is high, and when the Cubic Metric is low, the power level of unwanted emissions is low. Accordingly, as shown in FIG. 4, in the case of the identification information of the root sequence (0 to 455) with the low Cubic Metric, the MPR is set at 0 dB, and in the case of the identification information of the root sequence (456 to 837) with the high Cubic Metric, the MPR is determined based on the system bandwidth. By this means, it is possible to apply the MPR only in the case that the power level of unwanted emissions is actually high.

The descriptions above are summarized as described below. The MPR is determined based on the identification information of the root sequence and the system bandwidth, the MPR is applied to the random access preamble and the MPR range is reduced to as small as possible, therefore it is possible to reduce complexity of the power amplifier in the mobile terminal, and avoid reduction of the uplink cell radius.

Alternately, for example, based on the identification information of the root sequence to generate a random access preamble signal on the PRACH, the number of resource blocks (the number of RBs) of the PUCCH, and a second reference table to determine the maximum transmission power of a random access preamble as shown in Table 2, the random access preamble maximum transmission power setting section 112 may determine the MPR for the random access preamble, and by the MPR for the random access preamble, determine the maximum transmission power of the random access preamble. In addition, the maximum transmission power of a random access preamble is determined as described below:

(Maximum transmission power of a random access preamble)=rated power of the mobile terminal 100−MPR In addition, for example, the rated power of the mobile terminal 100 may be UE Maximum Output power (=23 dBm) as described in Table 6.2.2-1 in Non-patent literature 2.

TABLE 2

(1) The case of identification information of the root sequence ranging from 0 to 455

| | The number of RBs of PUCCH For all the System Bandwidths of 5 MHz) | | | | |
|---|---|---|---|---|---|
| | 0 | 2 | 4 | 6 | 8 | 10 or more |
| MPR (dB) | 0 dB | 0 dB | 0 dB | 0 dB | 0 dB | 0 dB |

(2) The case of identification information of the root sequence ranging from 456 to 837

| | The number of RBs of PUCCH (In the case of the system bandwidth of 5 MHz) | | | | |
|---|---|---|---|---|---|
| | 0 | 2 | 4 | 6 | 8 | 10 or more |
| MPR (dB) | 3 dB | 3 dB | 2 dB | 1 dB | 0 dB | 0 dB |

| | The number of RBs of PUCCH (In the case of the system bandwidth of 20 MHz) | | | | |
|---|---|---|---|---|---|
| | 0 | 2 | 4 | 6 | 8 | 10 or more |
| MPR (dB) | 2 dB | 2 dB | 1 dB | 0 dB | 0 dB | 0 dB |

More specifically, in the case that the identification information of the root sequence to generate a random access preamble signal on the PRACH is "10" (the case included in the range of 0 to 455), the maximum transmission power of a random access preamble may be determined, based on the reference table (1) of Table 2, assuming that MPR=0 dB in any values of the number of resource blocks (the number of RBs) of the PUCCH.

In addition, in this case, the maximum transmission power of a random access preamble may be determined based on the system bandwidth, in addition to the identification information of the root sequence to generate a random access preamble signal on the PRACH and the number of resource blocks (the number of RBs) of the PUCCH. For example, in the example as shown in (1) of Table 2, in any values of the system bandwidth, by assuming that MPR=0 dB, the maximum transmission power of a random access preamble may be determined. Alternately, the reference table (1) of Table 2 may be defined for each system bandwidth to determine the MPR, and the maximum transmission power of a random access preamble may thereby be determined.

Alternately, in the case that the identification information of the root sequence to generate a random access preamble signal on the PRACH is "467" (the case included in the range of 456 to 837), the system bandwidth is 5 MHz and that the number of resource blocks of the PUCCH is "2", the maximum transmission power of a random access preamble may be determined, assuming that MPR=3 dB, based on the reference table (2) of Table 2, the system bandwidth=5 MHz, and the number of RBs=2.

In addition, as shown in (2) in Table 2, the reference table may be set for each system bandwidth. In this case, the maximum transmission power of a random access preamble is determined based on the identification information of the root sequence to generate a random access preamble signal on the PRACH, the system bandwidth and the number of resource blocks (the number of RBs) of the PUCCH. In addition, when the reference table is not set for each system bandwidth, the maximum transmission power of a random access preamble may be determined based on the identification information of the root sequence to generate a random access preamble signal on the PRACH, and the number of resource blocks (the number of RBs) of the PUCCH.

In addition, the details of the method of generating a random access preamble signal on the PRACH are described in 5.7.2 in Non-patent literature 1. Further, the definition of the identification information of the root sequence to generate a random access preamble signal on the PRACH is described in Table 5.7.2-4 in 5.7.2 in Non-patent literature 1.

Figure 5:
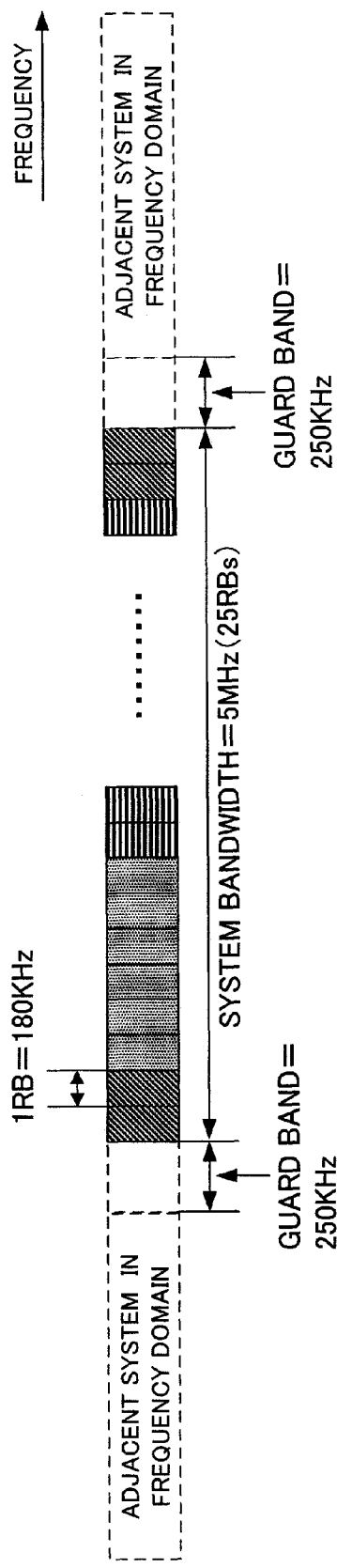
FIG. 5 is another diagram illustrating the effect by the method of determining maximum transmission power of a random access preamble according to the invention.
Figure 5:
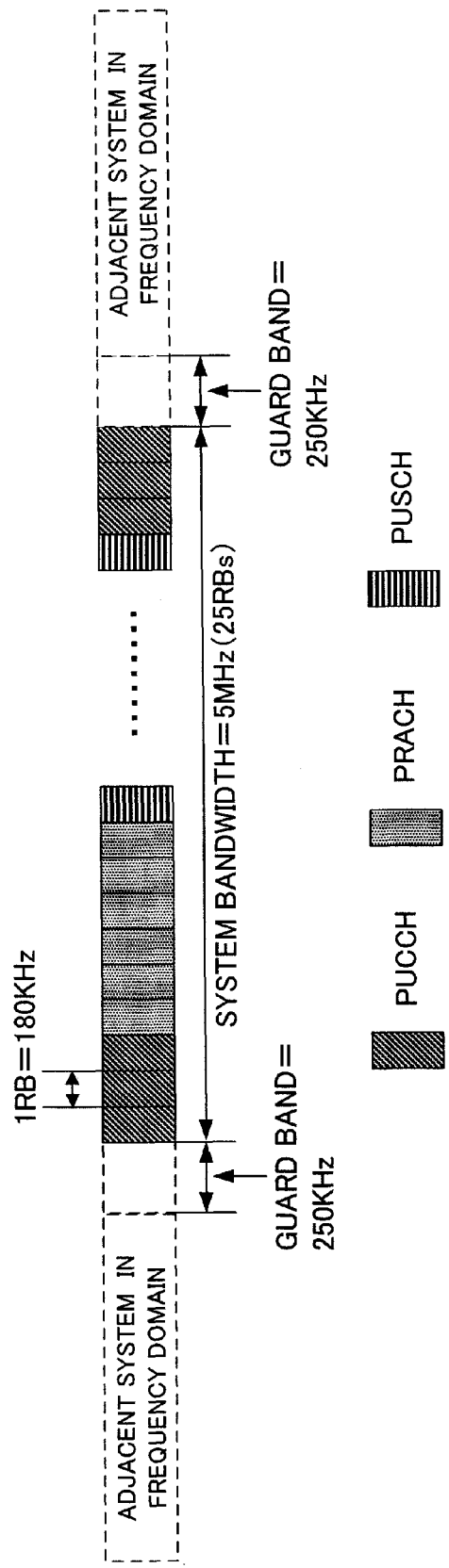

Referring to FIG. 5, described below is the effect of determining the maximum transmission power of a random access preamble based on the identification information of the root sequence to generate a random access preamble signal on the PRACH, and the number of resource blocks (the number of RBs) of the PUCCH.

FIG. 5 shows the position relationship on the frequency domain between the transmission frequency band of the PRACH and the adjacent system in frequency domain when the system bandwidth is 5 MHz and the number of resource blocks of the PUCCH is "4" or "6". When the system bandwidth is 5 MHz, as shown in FIG. 5, the guard band of 250 KHz is defined as the guard band. Further, since the PUCCH is positioned at opposite ends inside the system band, when the number of resource blocks of the PUCCH is "4", two resource blocks are assigned to each end as the resource blocks of the PUCCH, and when the number of resource blocks of the PUCCH is "6", three resource blocks are assigned to each end as the resource blocks of the PUCCH. In addition, the transmission band of the PRACH is defined to be adjacent to the PUCCH.

In other words, this means that the frequency interval between the transmission frequency band of the PRACH and the adjacent system in frequency domain when the number of resource blocks (the number of RBs) of the PUCCH is "4" is smaller than the frequency interval between the transmission frequency band of the PRACH and the adjacent system in frequency domain when the number of resource blocks (the number of RBs) of the PUCCH is "6". The power level of unwanted emissions to outside the system band is decreased, as increases the frequency distance length between the frequency band of the PRACH and the system affected by the unwanted emissions i.e. the frequency interval between the transmission band of a transmission signal and the frequency band of the system affected by the unwanted emissions. Therefore, when the number of resource blocks (the number of RBs) of the PUCCH is "4", larger MPR is defined to decrease the power level of unwanted emissions to outside the system band, and it is thereby possible to reduce the effect by the unwanted emissions. Meanwhile, when the number of resource blocks (the number of RBs) of the PUCCH is "6", since the frequency distance length is large, the power level of unwanted emissions to outside the system band is low, and it is thereby possible not to apply the MPR or decrease the value of MPR. As a result, it is possible to increase the maximum transmission power, and avoid reductions in the cell radius in uplink.

The identification information of the root sequence to generate a random access preamble signal on the PRACH is defined based on Cubic Metric as described in Non-patent literature 4. Herein, the Cubic Metric is one of indexes indicative of the power level of unwanted emissions to outside the system band as described above. In other words, when the Cubic Metric is high, the power level of unwanted emissions is high, and when the Cubic Metric is low, the power level of unwanted emissions is low. Accordingly, as shown in FIG. 5, in the case of the identification information of the root sequence (0 to 455) with the low Cubic Metric, the MPR is set at 0 dB, and in the case of the identification information of the root sequence (456 to 837) with the high Cubic Metric, the MPR is determined based on the number of resource blocks (the number of RBs) of the PUCCH or the system bandwidth. By this means, it is possible to apply the MPR only in the case that the power level of unwanted emissions is actually high.

The descriptions above are summarized as described below. The MPR is determined based on the identification information of the root sequence and the number of resource blocks (the number of RBs) of the PUCCH, the MPR is applied to the random access preamble and the MPR range is reduced to as small as possible, therefore it is possible to reduce complexity of the power amplifier in the mobile terminal, and avoid reduction of the uplink cell radius.

In addition, in the above-mentioned example, the maximum transmission power of a random access preamble is determined based on the identification information of the root sequence, the system bandwidth and the number of resource blocks (the number of RBs) of the PUCCH, and as a matter of course, may be determined based on at least one of the identification information of the root sequence, the system bandwidth and the number of resource blocks (the number of RBs) of the PUCCH.

Further, as shown in the above-mentioned example, the position of the transmission frequency band of the PRACH or the random access preamble is determined using the number of resource blocks of the PUCCH and the system bandwidth. In other words, the maximum transmission power of a random access preamble may be determined based on the identification information of the root sequence and the transmission frequency band of the PRACH or the random access preamble. In other words, when the transmission frequency band of the PRACH or the random access preamble is identified by the information indicative of the position of resource blocks for the PRACH, the maximum transmission power of the random access preamble may be determined based on the identification information of the root sequence and the information indicative of the position of resource blocks for the PRACH.

The random access preamble maximum transmission power setting section 112 notifies the random access preamble signal generating section 114 of the maximum transmission power of the random access preamble determined by the above-mentioned processing.

The random access preamble signal generating section 114 acquires the maximum transmission power of the random access preamble from the random access preamble maximum transmission power setting section 112.

The random access preamble signal generating section 114 generates a signal of the random access preamble when the mobile terminal 100 performs random access procedures for initial connection, handover, data resuming, etc. The details of the method of generating a random access preamble signal on the PRACH are described in 5.7.2 in Non-patent literature 1.

When the random access preamble signal generating section 114 generates the signal of the random access preamble, the section 114 may determine the power of the signal, for example, based on the path loss between the base station apparatus 200 and mobile terminal 100, the preamble initial received target power notified from the base station apparatus 200, and an offset value by power ramping. Herein, the power ramping means that the transmission power of a random access preamble is increased in retransmitting the random access preamble, and an increase amount of the transmission power is determined by the offset value and the number of retransmissions.

More specifically, the power of the signal is calculated as described below:

$$(\text{Power of the signal}) = (\text{Received target power}) + (\text{path loss}) + (\text{offset value by power ramping}) \times n$$

n: the number of retransmissions (assuming that the first transmission is "0" and that the second transmission (first retransmission) is "1")

Further, when the transmission power of the signal of the random access preamble exceeds the maximum transmission power of the random access preamble, the random access preamble signal generating section 114 sets the transmission power of the signal of the random access preamble at the maximum transmission power of the random access preamble. In other words, the transmission power of the random access preamble is set at the maximum transmission power of the random access preamble or less.

Then, the random access preamble signal generated in the random access preamble signal generating section 114 is output to the transmission/reception section 106, and subjected to the frequency conversion processing in the transmission/reception section 106, and then, the signal is amplified in the amplifying section 104, and is transmitted from the transmission/reception antenna 102. Herein, the transmission power of the signal of the random access preamble is the above-mentioned value determined in the random access preamble signal generating section 114.

Figure 6:
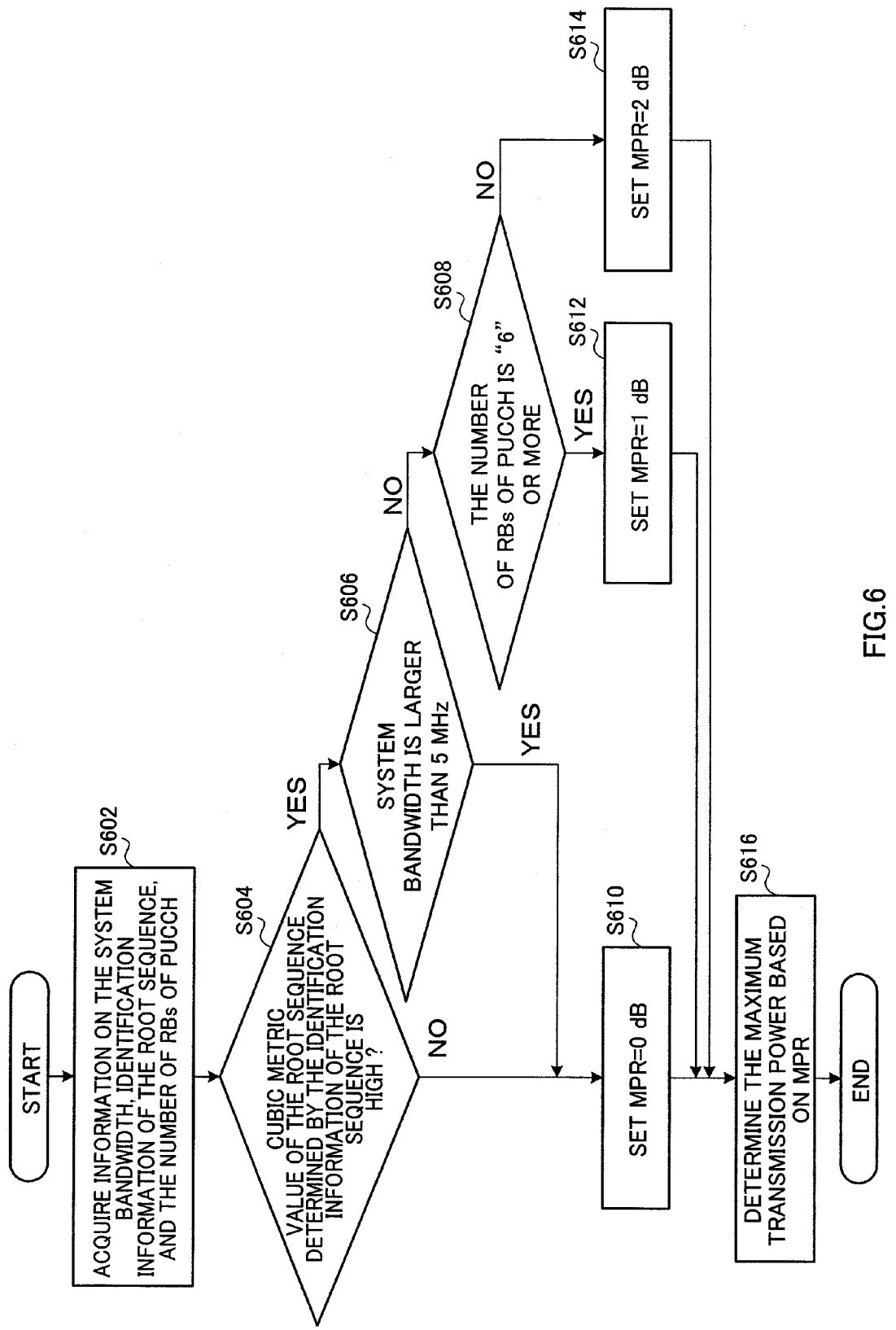
FIG. 6 is a flowchart illustrating a communication control method in the mobile terminal according to an Embodiment of the invention.

FIG. 6 shows a communication control method in the mobile terminal 100 according to the Embodiment of the invention.

In step S602, the mobile terminal 100 acquires the system bandwidth, the number of resource blocks (the number of RBs) of the PUCCH and the identification number of the root sequence of the random access preamble. For example, the system bandwidth, the number of resource blocks (the number of RBs) of the PUCCH and the identification number of the root sequence of the random access preamble are included in the broadcast information notified from the base station apparatus 200.

In step S604, the mobile terminal 100 determines whether the value of Cubic Metric of the root sequence determined by the identification information of the root sequence is high or not. When the value of Cubic Metric is high (step S604: Yes), the flow proceeds to step S606, while proceeding to step s610 when the value of Cubic Metric is low (step S604: No). Herein, the determination whether the value of Cubic Metric is high or low may be made based on the identification information of the root sequence to generate a random access preamble signal on the PRACH. More specifically, the value of Cubic Metric may be determined to be low when the identification information of the root sequence ranges from 0 to 455, while being determined to be high when the identification information of the root sequence ranges from 456 to 837.

In step S606, it is determined whether the system bandwidth is more than 5 MHz. In the case that the system bandwidth is more than 5 MHz (step S606: Yes), the flow proceeds to step S610, while proceeding to step S608 in the other cases (step S606: No)

In step S608, it is determined whether the number of resource blocks (the number of RBs) of the PUCCH is "6" or more. In the case that the number of resource blocks of the PUCCH is "6" or more (step S608: Yes), the flow proceeds to step S612, while proceeding to step S614 in the other case (step S608: No). In addition, in the processing in step S608, as described above, as a substitute for the number of resource blocks of the PUCCH, the determination whether the flow proceeds to step 612 or S614 may be made based on the information indicative of the position of resource blocks of the PRACH. More specifically, in the case that the position of resource blocks of the PRACH is assigned so as not to include at least one of six resource blocks at opposite ends inside the system band, the flow proceeds to step S612, while proceeding to step S614 in the other case.

In step S610, the value of MPR is set at 0 dB.
In step S612, the value of MPR is set at 1 dB.
In step S614, the value of MPR is set at 2 dB.

In step S616, the maximum transmission power of the random access preamble is determined based on the value of MPR. More specifically, the maximum transmission power of the random access preamble is determined as described below:

(Maximum transmission power of the random access preamble)=rated power of the mobile terminal 100−MPR Then, transmission of the random access preamble is performed based on the maximum transmission power of the random access preamble. More specifically, the transmission power of the random access preamble is set not to exceed the maximum transmission power of the random access preamble, and the random access preamble is transmitted using the transmission power.

In addition, in the flowchart as shown in FIG. 6, the value of MPR of the random access preamble is determined by comparing the system bandwidth with a predetermined threshold (5 MHz in FIG. 6), and as a substitute therefor, the value of MPR of the random access preamble may be determined based on the reference table as shown in Table 1.

Alternately, in the flowchart as shown in FIG. 6, the value of MPR of the random access preamble is determined by comparing the number of resource blocks of the PUCCH with a predetermined threshold ("6" in FIG. 6), and as a substitute therefor, the value of MPR of the random access preamble may be determined based on the reference table as shown in Table 2.

Further, in the flowchart as shown in FIG. 6, the value of MPR is determined based on the identification information of the root sequence, the system bandwidth, and the number of RBs of the PUCCH, and as a substitute therefor, the value of MPR may be determined based on part of the information on the identification information of the root sequence, the system bandwidth, and the number of RBs of the PUCCH.

In addition, in the above-mentioned example, the base station apparatus 200 notifies the mobile terminal 100 of the system bandwidth in uplink or downlink, the number of resource blocks (the number of RBs) of the PUCCH, the identification information of the root sequence (Root Sequence Index) to generate a random access preamble signal on the PRACH, the information indicative of the position of resource blocks for the PRACH, etc. as part of the broadcast information, and as a substitute therefor, using RRC message, such information may be notified to the mobile terminal 100 from the base station apparatus 200. More specifically, as part of the information included in HO command, base station apparatus 200 may notify the mobile terminal 100 of the system bandwidth in uplink or downlink, the number of resource blocks (the number of RBs) of the PUCCH, the identification information of the root sequence (Root Sequence Index) to generate a random access preamble signal on the PRACH, the information indicative of the position of resource blocks for the PRACH, etc.

According to the Embodiment of the invention, it is possible to provide a user terminal and communication control method for enabling reductions in the uplink cell radius to reduced, while reducing complexity of a power amplifier in the mobile terminal, by applying the MPR to the random access preamble while reducing the MPR range to as small as possible.

The above-mentioned Embodiment describes the examples in the system to which is applied Evolved UTRA and UTRAN (alias: Long Term Evolution or Super 3G), and the mobile terminal, base station apparatus, mobile communication system and communication control method according to the invention are applicable to other systems using the random access channel.

In addition, the above-mentioned operations of the mobile terminal UE and base station apparatus eNB may be implemented by hardware, software module executed by a processor, or combination thereof.

The software module may be provided in a storage medium of any form such as RAM (Random Access Memory), flash memory, ROM (Read Only Memory), EPROM (Erasable Programmable ROM), EEPROM (Electronically Erasable and Programmable ROM), register, hard disk, removable disk and CD-ROM.

The storage medium is connected to the processor to enable the processor to read and write the information from/in the storage medium. Further, the storage medium may be packed in the processor. Furthermore, the storage medium and the processor may be provided inside ASIC. The ASIC may be provided inside the mobile terminal UE and/or base station apparatus eNB. Moreover, the storage medium and the processor may be provided inside the mobile terminal UE and/or base station apparatus eNB as a discrete component.

As described above, the present invention is specifically described using the above-mentioned Embodiment, and it is obvious to a person skilled in the art that the invention is not limited to the Embodiment described in the description. The invention is capable of being carried into practice as modified and changed aspects without departing from the subject matter and the scope of the invention determined by descriptions in the scope of claims. Therefore, the descriptions in the description aim at illustrative explanation, and do not have any restrictive meaning on the invention.

The invention claimed is:

1. A user terminal that performs radio communications with a base station apparatus in a mobile communication system, comprising:
a processor for:
acquiring a parameter from the base station apparatus, wherein the parameter includes a variable number of resource blocks of an uplink control channel (PUCCH) allocated at both ends of a system band and an identification number of a root sequence of a random access preamble (PRACH); and
transmitting the random access preamble to the base station apparatus by using a PRACH (Physical Random Access Channel) formed with six resource blocks,
wherein a maximum value of transmission power of the PRACH is defined as a rated power minus MPR (maximum power reduction), the MPR being determined by the variable number of resource blocks of the PUCCH and the identification number of the root sequence of the PRACH, and the rated power being defined in the mobile communication system.

2. The user terminal according to claim 1, wherein
the maximum value of transmission power of the random access preamble is set to be the same as the rated power defined in the mobile communication system when the number of resource blocks of the uplink control channel is larger than a predetermined threshold, and
the maximum value of transmission power of the random access preamble is set to be lower than the rated power defined in the mobile communication system when the number of resource blocks of the uplink control channel is the same as the predetermined threshold or less.

3. A communication control method in a user terminal that performs radio communications with a base station apparatus in a mobile communication system, comprising:
a first step of acquiring a variable number of resource blocks of an uplink control channel (PUCCH) allocated at both ends of a system band and an identification number of a root sequence of a random access preamble (PRACH) from the base station apparatus; and
a second step of transmitting the random access preamble to the base station apparatus by using a PRACH (Physical Random Access Channel) formed with six resource blocks,
wherein in the second step, a maximum value of transmission power of the PRACH is defined as a rated power minus MPR (maximum power reduction), the MPR being determined by the variable number of resource blocks of the PUCCH and the identification number of the root sequence of the PRACH, and the rated power being defined in the mobile communication system.

* * * * *